United States Patent [19]

Miller et al.

[11] Patent Number: 4,970,007
[45] Date of Patent: Nov. 13, 1990

[54] AQUEOUS SURFACTANT MIXTURES, AND THE USE THEREOF IN THE RECOVERY OF CRUDE OIL

[75] Inventors: Dennis Miller, Eppstein; Manfred Schmidt, Kelkheim; Arno Holst, Wiesbaden; Sigmar-Peter von Halasz, Liederbach, all of Fed. Rep. of Germany

[73] Assignee: Hoechst Aktiengesellschaft, Frankfurt am Main, Fed. Rep. of Germany

[21] Appl. No.: 320,776

[22] Filed: Mar. 8, 1989

[30] Foreign Application Priority Data

Mar. 10, 1988 [DE] Fed. Rep. of Germany ....... 3807945

[51] Int. Cl.$^5$ ............................................. F21B 43/22
[52] U.S. Cl. ................................ 252/8.554; 166/275; 166/274
[58] Field of Search ..................... 252/8.554; 166/275, 166/274

[56] References Cited

U.S. PATENT DOCUMENTS

| | | | |
|---|---|---|---|
| 4,018,278 | 4/1977 | Shupe | 166/252 |
| 4,077,471 | 3/1978 | Shupe et al. | 166/275 |
| 4,088,189 | 5/1978 | Shupe | 166/272 |
| 4,194,565 | 3/1980 | Kalfoglou | 166/275 |
| 4,269,271 | 5/1981 | Shupe et al. | 166/274 |

Primary Examiner—Robert L. Stoll
Assistant Examiner—Chhaya Sayala

[57] ABSTRACT

Surfactant mixtures made from 5 to 80% by weight of an ether sulfonate, 5 to 80% by weight of an alkyl or alkylphenol polyglycol ether and 10 to 80% by weight of an alkanesulfonate, petroleumsulfonate or alkylbenzenesulfonate. This combination of surfactants produces stable, aqueous solutions or dispersions which are highly suitable for surfactant flooding in tertiary oil recovery since these aqueous surfactant solutions or dispersions form microemulsions with the oil even at high salinities.

7 Claims, 1 Drawing Sheet

AQUEOUS SURFACTANT MIXTURES, AND THE USE THEREOF IN THE RECOVERY OF CRUDE OIL

DESCRIPTION

In the recovery of crude oil, only a small proportion of the oil present in the reservoir is usually recovered. In order to increase the yield, water is injected into the reservoir—so-called water flooding—or an aqueous surfactant solution is injected—so-called surfactant flooding. In this surfactant flooding process, the surfactant is injected into the reservoir as an aqueous solution or dispersion. The prerequisite for this is that these solutions or dispersions are stable. In addition, it has proven particularly favorable for oil drainage if these solutions or dispersions form microemulsions with the oil in the reservoir. The interrelationships between the amount of microemulsion, the interfacial tension and oil drainage are the subject of numerous experimental and theoretical papers. The amount of microemulsion is described here by means of the solubilization parameter (oil:surfactant ratio by volume in the microemulsion at optimum salinity). A high solubilization parameter favors oil drainage. The type of surfactant which can be used in surfactant flooding depends on the specific conditions in the reservoir, for example on the temperature, the nature of the rock and the composition of the oil. The salinity of the reservoir is particularly important here since each surfactant is only effective for a certain salinity range. At high salinities, the effectiveness of most surfactants is impaired by poor solubility.

It has already been disclosed to use alkylphenol polyglycol ether sulfonates in surfactant flooding (U.S. Pat. No. 4,018,278). An improved effect is achieved if these compounds are combined with other surfactants, for example with oxalkylated aliphatic alcohols or oxalkylated alkylphenols (U.S. Pat. No. 4,077,471, U.S. Pat. No. 4,269,271 and German Application No. 3,725,938).

However, oxalkylated alcohols and phenols exhibit a lower solubilization parameter than the corresponding ether sulfonates (Miller: Proc. 4th Eur. Symp. on Enhanced Oil Recovery, Hamburg 1987, pp. 925–933). This impairs the action of the surfactant mixtures which contain non-ionic surfactants of this type.

It has now been found that surfactant mixtures based on di- or trialkylphenol polyglycol ether sulfonates and alkyl or alkylphenol oxethylates have a high solubilization parameter on microemulsion formation if the oxethylate has a long alkyl chain. Surfactant mixtures of this type form stable solutions or dispersions even in salt water. However, separation of these mixtures into the three phases salt water, oil and microemulsion is too slow in the region of optimum salinity. By adding a simple sulfonate, for example alkanesulfonate, the rapid phase separation which is desired can be achieved.

The invention accordingly relates to aqueous surfactant compositions containing a surfactant mixture made from (a) 5 to 85% by weight, preferably 10 to 70% by weight, of an ether sulfonate of the formula $$RO(AO)_m A\ SO_3M$$

where R denotes $C_6$–$C_{12}$-alkyl or a group of the formula

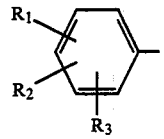

$R_1$ and $R_2$ denote $C_3$–$C_6$-alkyl, and $R_3$ denotes hydrogen or $C_1$–$C_6$-alkyl, A denotes a —$C_2H_4$— or —$C_3H_6$— group or a mixture of the two groups, m denotes a number from 3 to 20, preferably 4 to 18, and M denotes an alkali metal atom or ammonium, (b) 5 to 85% by weight, preferably 10 to 70% by weight, of a polyglycol ether of the formula $$R_4O(AO)_nH$$

where $R_4$ denotes $C_{16}$–$C_{22}$-alkyl, $C_{16}$–$C_{22}$-al a group of the formula

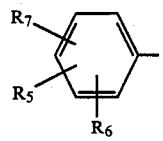

$R_5$ and $R_6$ denote hydrogen or $C_1$–$C_{12}$-alkyl, $R_7$ denotes a $C_9$–$C_{18}$-alkyl A denotes a —$C_2H_4$— or —$C_3H_6$—group or a mix the two groups, and n denotes a number from m-3 to 20, and (c) 10 to 90% by weight, preferably 20 to 70% by weight, of a primary or secondary $C_8$–$C_{22}$-alkanesulfonate, petroleumsulfonate, olefinsulfonate, alkylbenzenesulfonate or mixtures thereof.

The lowest value for n in component (b) is defined such that, for a given value of m, the lowest value for n is calculated from this value for m minus 3.

The total surfactant content in the aqueous composition described is about 20 to 80% by weight. For surfactant flooding, these aqueous compositions are further diluted with water to a surfactant content of from about 0.1 to 10% by weight. The water from the reservoir, which has a varying salt content, is preferably used for this purpose.

In order to improve the action, crude oil or hydrocarbons or $C_3$–$C_6$-alcohols can added to the flooding water. Recovery of crude oil by surfactant flooding using the surfactant mixture described above can combined in a customary manner with polymer flooding.

The three-component system described above is distinguished by the fact that it is phase-stable in water and, in addition, forms microemulsions with the crude oil. These properties are also exhibited in highly saline waters, such as those having a salt content of greater than 10%. By using a combination of the di- or trialkylphenol polyglycol ether sulfonate having short alkyl chains and an alkyl or alkylphenol alkoxide having a long alkyl chain, a higher solubilization parameter and thereby a better action is achieved.

By contrast, U.S. Pat. No. 4,077,471 describes only mixtures of alkyl or alkylphenol ether sulfonates with polyglycol ethers which contain the same hydrophobic group. German Application No. 3,725,938 describes mixtures of ether sulfonate, polyglycol ethers and alkanesulfonates which essentially differ from the mixtures in the present case through the alkylene oxide content in component (b).

EXPERIMENTAL PART

Testing the phase behavior

For microemulsion experiments, equal amounts of oil and salt water were used, and the salinity range in which the mixture separated into the three phases salt water, microemulsion and oil was observed. The salinity at which the microemulsion contains equal proportions of oil and water is known as the optimum salinity. The oil:surfactant ratio by volume in the microemulsion at optimum salinity is known as the solubilization parameter. The solubilization parameter is a measure of the amount of microemulsion formed.

Various surfactant/salt water mixtures without oil having different salinity were also prepared. After thorough mixing, the samples were conditioned for 24 hours. A distinction is made between three types of phase behavior:
(a) clear solution
(b) phase separation
(c) transparent or turbid homogeneous dispersion.

koxylate. Mixture No. 1 according to the invention (having a long chain) exhibits a much greater solubilization parameter than comparison mixture No. 2.

2. Microemulsion formation

Table 3 shows three further surfactant mixtures according to the invention which form microemulsions with model oil I.

3. Phase behavior with and without oil

BRIEF DESCRIPTION OF THE DRAWING

The phase behavior of mixture No. 6 is shown in FIG. 1 as a function of temperature and salinity. This mixture comprises 30% of $(C_4H_9)_3.C_6H_2.O(ZC_2H_4O)_9.C_2H_4SO_3Na$, 30% of $C_{18}H_{37}.C_6H_4.O(C_2H_4O)_{10}H$ and 40% of sec. alkanesulfonate having 15.5 carbon atoms.

Area 1 with horizontal hatching indicates the region of a stable and homogeneous surfactant/salt water dispersion. Area 2 with vertical hatching indicates microemulsion formation with model oil III. The area where these two regions overlap indicates that the mixture is effective for tertiary oil recovery.

TABLE 1

Figure 1:
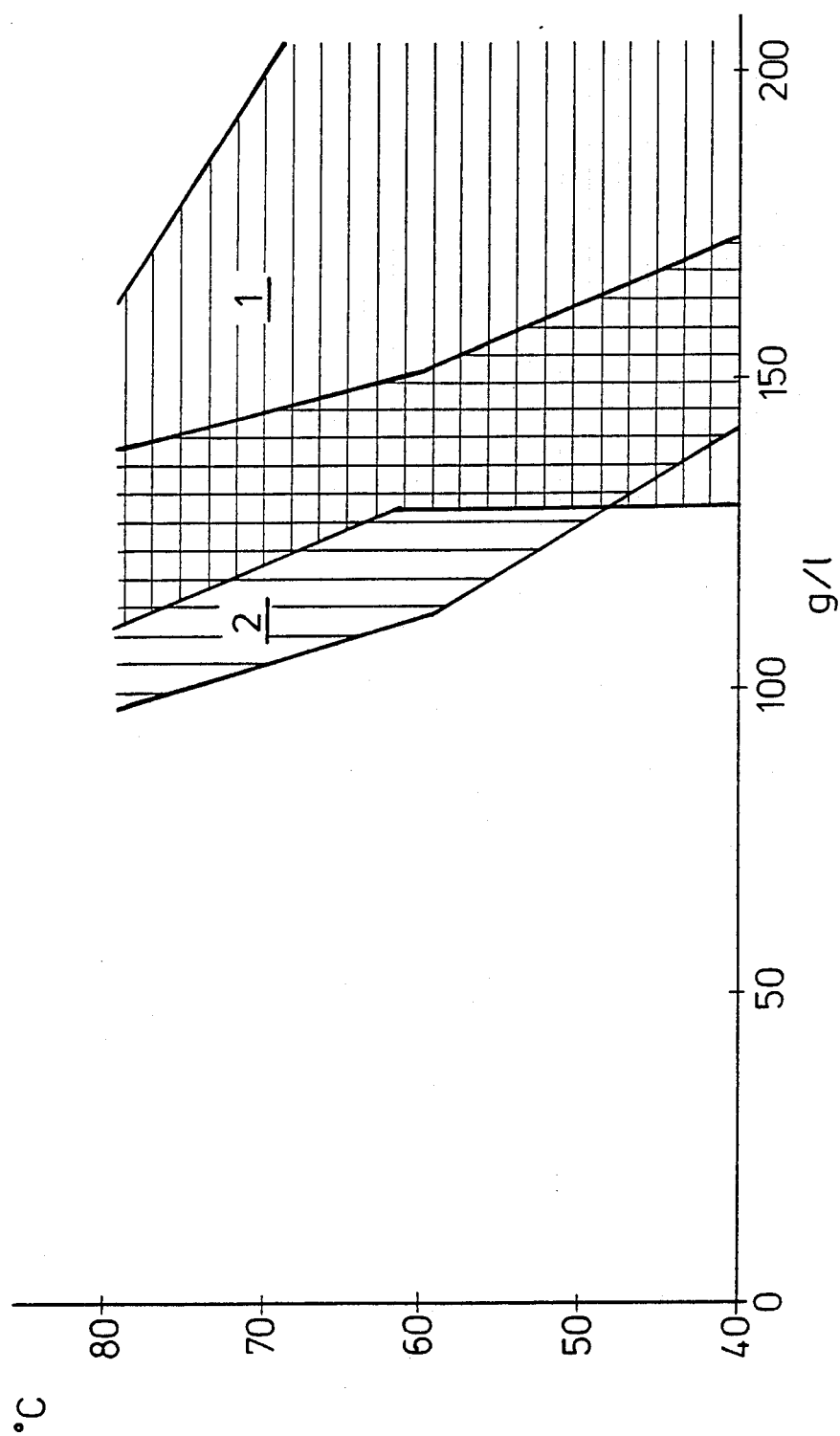

Effect of the length of the alkyl chain of the oxalkylate

| | Surfactant mixture | | | | | | Phase behavior 60° C. model reservoir salt Salt water + surfactant + oil | | |
|---|---|---|---|---|---|---|---|---|---|
| No. | Ether sulfonate | % | Oxalkylate | % | Simple sulfonate | % | Oil* | Optimum salinity g/l | Solubilization parameter |
| 1 | $(C_4H_9)_3.C_6H_2.O(C_2H_4O)_9C_2H_4SO_3Na$ | 40 | $C_{18}H_{37}.C_6H_4.O(C_2H_4O)_{10}H$ | 40 | Sec. alkanesulfonate having an average of 15.5 carbon atoms | 20 | I | 125 | 8.2 |
| | | | | | | | II | 107 | 12.2 |
| 2 | $(C_4H_9)_3.C_6H_2.O(C_2H_4O)_9C_2H_4SO_3Na$ | 40 | $C_9H_{19}.C_6H_4.O(C_2H_4O)_{10}H$ | 40 | Sec. alkanesulfonate having an average of 15.5 carbon atoms | 20 | I | 150 | 4.5 |
| | | | | | | | II | 138 | 6.1 |

*see Table 2

The salt used was a model reservoir salt comprising 95% of NaCl, 3% of $CaCl_2$, 1.75% of $MgCl_2$ and 0.25% of $Na_2SO_4$. Various hydrocarbon mixtures were used as model oils (Table 2). The surfactant content was 2%, based on the salt water.

EXAMPLES

1. Effect of the length of the alkyl chain of the alkoxylate on the solubilization parameter Comparison of the two mixtures in Table 1 shows the role played by the length of the alkyl chain of the al-

TABLE 2

Model oils

| No. | Description | Density at 25° C. g/cm³ | Refractive index 25° C. |
|---|---|---|---|
| I | Predominantly alkanes | 0.830 | 1.4555 |
| II | Alkanes containing about 20% of aromatic/naphthenic hydrocarbons | 0.824 | 1.4572 |
| III | Refined oil, naphthenic | 0.881 | 1.4877 |

TABLE 3

Microemulsion formation of surfactant mixtures according to the invention

| | Surfactant mixture | | | | | | Phase behavior 60° C. model reservoir salt Salt water + surfactant + model oil No. I | |
|---|---|---|---|---|---|---|---|---|
| No. | Ether sulfonate | % | Alkoxylate | % | Simple sulfonate | % | Optimum salinity g/l | Solubilization parameter |
| 3 | $(C_4H_9)_3.C_6H_2.O(C_2H_4O)_9C_2H_4SO_3Na$ | 40 | $C_{18}H_{37}.O(C_2H_4O)_{10}H$ | 40 | Sec. alkanesulfonate having an average of 15.5 carbon atoms | 20 | 140 | 9.5 |

TABLE 3-continued

Microemulsion formation of surfactant mixtures according to the invention

| No. | Ether sulfonate | % | Alkoxylate | % | Simple sulfonate | % | Phase behavior 60° C. model reservoir salt Salt water + surfactant + model oil No. I Optimum salinity g/l | Solubilization parameter |
|---|---|---|---|---|---|---|---|---|
| 4 | $(C_4H_9)_3.C_6H_2.O(C_2H_4O)_9C_2H_4SO_3Na$ | 40 | Oleyl-$O(C_2H_4O)_{10}H$ | 40 | Sec. alkanesulfonate having an average of 15.5 carbon atoms | 20 | 140 | 8.0 |
| 5 | $(C_4H_9)_3.C_6H_2.O(C_2H_4O)_{14}C_2H_4SO_3Na$ | 40 | $C_{18}H_{37}.C_6H_4.O(C_2H_4O)_{11}H$ | 40 | Sec. alkanesulfonate having an average of 15.5 carbon atoms | 20 | 165 | 8.2 | see Table 2

Adsorption on quartz

Method: Several samples comprising 1,000 ppm of surfactant solution were equilibrated for 24 hours with quartz sand (surface area about 0.13 m²/g). The amount of quartz was up to 0.35 g per ml of solution. The liquid was then separated off and analyzed using the following methods:
(a) Two-phase titration for determination of anionic surfactants
(b) UV adsorption for determination of aromatic compounds
(c) Colorimetric determination of the complex using $CoCl_2$ and $NH_4SCN$ after extraction in $C_2H_4Cl_2$. This method can be used to measure the amount of ethoxylated compounds.

The proportions of the three surfactants (simple sulfonate, ether sulfonate and ethoxylate) can be calculated from these three measurements. This calculation becomes simpler if only one of the surfactants contains an aromatic ring. The surfactant content as a function of the amount of quartz is used to determine the adsorption in mg of surfactant per g of quartz. Under the experimental conditions used here, this adsorption corresponds approximately to the limiting value. The best way of comparing the adsorption of the various components of the surfactant mixture is to use the specific adsorption $a_i'$.

$$a_i' = \frac{a_i}{w_i}$$

where $a_i$ is the adsorption of component i and $w_i$ is the proportion by weight thereof in the surfactant mixture. If all components had the same value of $a_i$, there would be no chromatographic separation of the surfactants.

Table 4 shows the specific adsorption $a_i'$ of the three components of a surfactant mixture according to the invention at high salinity. There are hardly any differences in the values of $a_i'$. As a comparison, the adsorption a of the three individual surfactants was measured. This comparison experiment was carried out without addition of salt since not all three individual surfactants are soluble even at moderate salinities. In the case of the individual surfactants, the adsorption of the non-ionic components is much stronger than that of the two anionic surfactants. There is obviously a synergistic effect in the mixture which compensates for differences of this type in the adsorption.

The virtually identical value for the adsorption $a_i'$ of the surfactants in the mixture shows that all the surfactants in the mixture are adsorbed to an equal extent. It can thus be concluded that homogeneous absorption of all three surfactants by the reservoir rock takes place even when this surfactant mixture is used to improve the yield in oil recovery. This prevents differences in adsorption occurring in the sense of chromatographic separation, which would cause the surfactant mixture to separate and thus become ineffective.

TABLE 4

Adsorption on quartz (a) Surfactant mixture according to the invention
Salinity: 170 g/l, temperature 60° C.

| Component Formula | % | $a_i'$ mg/g |
|---|---|---|
| $(C_4H_9)_3.C_6H_2.(OCH_2CH_2)_{10}SO_3Na$ | 10 | 1.1 |
| sec. alkanesulfonate having an average of 15.5 carbon atoms | 60 | 1.1 |
| $C_{18}H_{37}.(OCH_2CH_2)_{10}OH$ | 30 | 1.0 |

(b) Individual surfactants (comparison experiment)
Salinity 0 g/l, temperature 60° C.

| Surfactant | a mg/g |
|---|---|
| $(C_4H_9)_3.C_6H_2.(OCH_2CH_2)_{10}SO_3Na$ | <0.1 |
| sec. alkanesulfonate having an average of 15.5 carbon atoms | <0.1 |
| $C_{18}H_{37}.(OCH_2CH_2)_{10}OH$ | 0.9 |

We claim:
1. An aqueous surfactant composition containing a surfactant mixture comprising
(a) 5 to 85% by weight, of an ether sulfonate of the formula

$RO(AO)_mA\ SO_3M$ where R

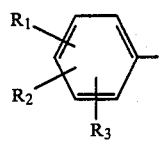

is tributylphenyl, A denotes a $—C_2H_4—$ or $—C_3H_6—$ group or a mixture of the two groups, m denotes a number from 3 to 20, and
M denotes an alkali metal atom or ammonium,
(b) 5 to 85% by weight, of a polyglycol ether of the formula $R_4O(AO)_nH$ where
$R_4$ denotes $C_{16}$–$C_{22}$-alkyl, $C_{16}$–$C_{22}$-alkenyl or a group of the formula

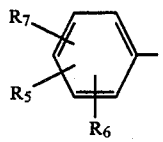

$R_5$ and $R_6$ denote hydrogen or $C_1$–$C_{12}$-alkyl, $R_7$ denotes a $C_9$–$C_{18}$-alkyl, A denotes a —$C_2H_4$— or —$C_3H_6$—group or a mixture of the two groups, and n denotes a number from m-3 to 20, and (c) 10 to 90% by weight, of a primary or secondary $C_8$–$C_{22}$-alkanesulfonate, petroleumsulfonate, olefinsulfonate, alkylbenzenesulfonate or a mixture thereof.

2. A process for increasing the yield during oil recovery by surfactant flooding, which comprises adding a surfactant mixture as claimed in claim 1 to the flooding water.

3. The process as claimed in claim 2, wherein 0.1 to 10% by weight of the surfactant mixture are added to the flooding water.

4. An aqueous surfactant composition as claimed in claim 1, wherein said ether sulfonate of step (a) is present in an amount ranging from 10 to 70% by weight.

5. An aqueous surfactant composition as claimed in claim 1, wherein said m denotes a number from 4 to 18.

6. An aqueous surfactant composition as claimed in claim 1, wherein said polyglycol ether of step (b) is present in an amount ranging from 10 to 70% by weight.

7. An aqueous surfactant composition as claimed in claim 1 wherein said primary or secondary $C_8$–$C_{22}$-alkanesulfonate, petroleumsulfonate, olefinsulfonate, alkylbenzenesulfonate or a mixture thereof, of step (c) is present in an amount ranging from 20 to 70% by weight.

* * * * *